United States Patent [19]

Bokerman et al.

[11] Patent Number: 5,051,248

[45] Date of Patent: Sep. 24, 1991

[54] SILANE PRODUCTS FROM REACTION OF SILICON MONOXIDE WITH HYDROGEN HALIDES

[75] Inventors: Gary N. Bokerman; John P. Cannady, both of Madison, Ind.; Charles S. Kuivila, LaGrange, Ky.

[73] Assignee: Dow Corning Corporation, Midland, Mich.

[21] Appl. No.: 567,576

[22] Filed: Aug. 15, 1990

[51] Int. Cl.$^5$ ............................................. C01B 33/107
[52] U.S. Cl. ...................................... 423/347; 423/342
[58] Field of Search .................. 423/347, 342; 556/474

[56] References Cited

U.S. PATENT DOCUMENTS

| | | | |
|---|---|---|---|
| 3,660,448 | 5/1972 | Schaschel | 556/410 |
| 3,660,449 | 5/1972 | Schaschel | 556/430 |
| 3,660,450 | 5/1972 | Timms | 556/434 |
| 3,660,451 | 5/1972 | Schaschel | 556/452 |
| 3,661,961 | 5/1972 | Schaschel | 556/451 |
| 4,585,646 | 4/1986 | Gomberg | 423/658.2 |

FOREIGN PATENT DOCUMENTS 2630542  1/1978  Fed. Rep. of Germany ...... 423/347

Primary Examiner—Olik Chaudhuri
Assistant Examiner—Ken Horton
Attorney, Agent, or Firm—William F. Boley

[57] ABSTRACT

The present invention is processes for preparing silanes from the reaction of silicon monoxide with hydrogen halides. In a first embodiment of the instant invention, silicon monoxide is reacted with a hydrogen halide to produce silanes and halosilanes. In a second embodiment of the instant invention, the silicon monoxide is activated by heating in an inert atmosphere prior to contact with the hydrogen halide. In a third embodiment of the instant invention, a catalyst is employed which enhances conversion of silicon monoxide to silanes and modifies process selectivity for silane products. The catalyzed process can be run with activated or non-activated silicon monoxide.

21 Claims, No Drawings

SILANE PRODUCTS FROM REACTION OF SILICON MONOXIDE WITH HYDROGEN HALIDES

BACKGROUND OF INVENTION

The present invention relates to processes for preparing silanes from the reaction of silicon monoxide with hydrogen halides. In a first embodiment of the instant invention, silicon monoxide is reacted with a hydrogen halide to produce silanes and halosilanes. In a second embodiment of the instant invention, the silicon monoxide is activated by heating in an inert atmosphere prior to contact with the hydrogen halide. In a third embodiment of the instant invention, a catalyst is employed which enhances both conversion of silicon monoxide to silanes and selectivity of the silane products produced. The catalyzed process can be run with activated or non-activated silicon monoxide. An additional product of the described processes is silicon dioxide.

Silanes are primarily produced by the direct reaction of silicon with organic halides or hydrogen halides, as first disclosed by Rochow and his co-workers in the 1940's. A significant portion of the cost of this process is the cost of the silicon metal used as a feed material. Silicon metal is typically produced in an electric-arc furnace by the carbothermic reduction of silicon dioxide. This process requires high temperature and high energy consumption, which is reflected in the cost of silicon metal.

Silicon monoxide requires lower temperature than silicon to produce and, thus, may serve as a less expensive source of raw material for the production of silanes. The instant invention describes processes for reacting solid silicon monoxide with hydrogen halides to produce silanes.

Schaschel, in a series of patents, describes a process for preparing organosilicon polymers by reacting silicon monoxide with organic compounds. The methods of the described invention involved preparation of silicon monoxide vapors from solid silicon monoxide by heating the same under vacuum to about 1200° C. to 1300° C.; mixing in a chamber having cooled walls the gaseous silicon monoxide and an excess of a volatile organic compound to form a mixture; and condensing the mixture to obtain the organosilicon polymer. The reaction was reported to occur on the cold surface of the chamber to form the polymer thereupon.

The organic compounds taught by Schaschel are: Schaschel, U.S. Pat. No. 3,660,448, issued May 2, 1972, organic compounds containing active hydrogen atoms such as alcohols and amines; Schaschel, U.S. Pat. No. 3,660,449, issued May 2, 1972, organic compounds containing a triple bond such as acetylene; Schaschel, U.S. Pat. No. 3,660,451, issued May 2, 1972, organic monohalides such as 1bromobutane; and Schaschel, U.S. Pat. No. 3,661,961, issued May 9, 1972, aliphatic hydrocarbons such as n-octane.

Timms, U.S. Pat. No. 3,660,450, issued May 2, 1972, teaches a process for reacting gaseous silicon monoxide with an aromatic compound containing at least one benzene nucleus, the compound having no triple bonds and having no active hydrogen atoms. The described process is similar to that previously described for the Schaschel series of patents.

Gomberg, U.S. Pat. No. 4,585,646, issued Apr. 29, 1986, teaches a process where $Si_2OCl_6$ is irradiated to form solid SiO. The solid SiO is isolated and reacted at 500° C. with HCl. The process is reported to form tetrachlorosilane, water, and hydrogen gas. No SiH products are produced. In addition, no activation process for the silicon monoxide or use of a catalyst is taught.

SUMMARY OF INVENTION

The instant invention relates to processes for reacting solid silicon monoxide with hydrogen halides to produce silanes and halosilanes. In a first embodiment of the instant invention, silicon monoxide is reacted with hydrogen halide to produce silanes and halosilanes. In a second embodiment of the instant invention, the silicon monoxide is activated by heating in an inert atmosphere prior to contact with the hydrogen halide. The activation step results in higher conversion of the silicon monoxide to product silanes, for a given process temperature.

In a third embodiment of the instant invention, silicon monoxide is reacted with a hydrogen halide in the presence of a metal or metal salt effective as a catalyst. The catalyst allows the process to be run at lower temperatures and increases conversion of silicon monoxide to silanes, as well as affecting selectivity of the type of silanes produced. The catalyzed process can be run with activated or non-activated silicon monoxide.

Silicon dioxide, formed as a product of the instant described processes, is also claimed.

DESCRIPTION OF INVENTION

The instant invention is processes for preparing silanes of the formula:

$$H_nSiX_{4-n},$$

where n=0 to 4 and X is a halogen.

The described processes are suitable for producing silane, $SiH_4$, as well as halosilanes. The silanes which be produced by the described process are, for example, $SiH_4$, and the mono-, di-, tri-, and tetra- halogenated silanes. Examples of halogenated silanes are: chlorosilane, dichlorosilane, trichlorosilane, and tetrachlorosilane.

A first embodiment of the instant invention is a process comprising: Contacting solid silicon monoxide with a hydrogen halide of formula HX; where X is a halogen; at a reaction temperature of 500° C. to 1200° C.

The source of the silicon monoxide is not critical to the instant described processes. However, a preferred source is silicon monoxide produced by the carbothermic reduction of silicon dioxide, since this source allows for energy savings incurred by not requiring the total reduction of silicon dioxide to silicon.

The solid silicon monoxide can b particles in the form of, for example, chips, flakes, powders, or granules. A range of useful particle size is about 0.5 micron to 120 mesh. A preferred particle size range is about 2 micron to about 320 mesh. The term "about," is meant to include similar particle sizes, which give comparable levels of silicon monoxide conversion and similar product selectivity.

In general, the smaller the particle size of the silicon monoxide, the higher the conversion of silicon monoxide to silanes. The lower-end of the particle size range is limited primarily by the ability to efficiently make and handle the particulate silicon monoxide. Silicon monoxide of particle size greater than that described will work in the instant processes, however, conversion of silicon monoxide to silanes may be reduced.

In a second embodiment of the instant invention, the solid silicon monoxide is activated by heating at an activation temperature of 50° C. to 1200° C. in an inert atmosphere. The solid silicon monoxide can be activated during manufacture or as a separate step. A preferred activation temperature range is about 200° C. to 900° C. A more preferred activation temperature range is about 400° C. to about 800° C. By "about," it is meant similar temperatures which give comparable silicon monoxide conversion and product selectivity under similar process conditions.

In general, an activation time of 1 to 20 hours has been found to be useful, when the activation temperature range is 50° C. to 1200° C. Preferred is an activation time of 10 to 18 hours, when the activation temperature is in the range of 400° C. to 800° C.

The silicon monoxide is activated in an environment which has been purged of oxygen. Typically, the silicon monoxide will be activated in the reactor in which it is to be contacted with the hydrogen halide. The reactor can be purged of oxygen by, for example, applying a vacuum or purging with an inert gas. The inert purging gas can be any gas which is inert to the silicon monoxide particles or contaminants thereof. Examples of purging gases are argon, helium, and nitrogen. Helium and nitrogen are preferred purging gas. The purging gas is passed through the reactor for a time sufficient to remove oxygen.

The activated solid silicon monoxide is contacted with a hydrogen halide. The halogen halide can be hydrogen chloride, hydrogen fluoride, hydrogen bromide, hydrogen iodide, or mixtures thereof. The preferred halogen halide is hydrogen chloride. The contacting can be effected in any standard reactor for effecting contact of gases with particulate solids. The process can be conducted, for example, in a fixed-bed reactor, a stirred-bed reactor, a vibrating-bed reactor, or a fluidized-bed reactor.

When the activated silicon monoxide is contacted with a hydrogen halide at temperatures between about 200° C. to 1200° C., conversion of silicon monoxide to silanes is achieved. Activation of the silicon monoxide results in increase silane production. A preferred reaction temperature range is 400° C. to 900° C.

Preferred conditions are, where the hydrogen halide gas is passed through a bed of solid particulate silicon monoxide at a rate of 0.5 to 60 sccm per gram of silicon monoxide. More preferred, is when the hydrogen halide gas is passed through the silicon monoxide at a rate of 1 to 5 sccm per gram of silicon monoxide.

The reaction time for hydrogen halide with silicon monoxide will depend on activation conditions for the silicon monoxide, reaction temperature, concentration of hydrogen halide, and desired conversion of silicon monoxide. In general, reaction times between about 4 hours and 48 hours have been found useful. Shorter reaction times may be employed, but with reduced conversion of silicon monoxide. Longer reactions times may also be employed to advantage, depending upon the continuing presence of silicon monoxide in the reactor.

In a third embodiment of the instant described invention, a catalyst is employed which is effective in facilitating reaction of the solid silicon monoxide with the hydrogen halide. By effective, it is meant chemical elements and compounds thereof which, in the presence of a hydrogen halide, increase the conversion of silicon monoxide to silanes, increase the rate of conversion, or modify the distribution of silane products. Any or all of the aforementioned effects may be an indication of effectiveness of the catalyst.

Materials which are effective catalysts in the described process are, for example, copper and copper compounds, tin and tin compounds, zinc and zinc compounds, antimony and antimony compounds, mercury and mercury compounds, iron and inorganic iron compounds, manganese and manganese compounds, nickel and nickel compounds, phosphorous, metal phosphides, metal phosphorous alloys, aluminum salts, and mixtures thereof.

A preferred catalyst is selected from the group consisting of $CuCl$, $ZnCl_2$, $SnCl_2$, copper and phosphorous alloy, and mixtures thereof. A more preferred catalyst is selected from the group consisting of copper and copper compounds and tin and tin compounds. The most preferred catalyst is cuprous chloride, $CuCl$.

The catalyst can be in any convenient particulate form, for example, powder, granule, flake or chip. The catalyst is mixed with the silicon monoxide by means for distributing the catalyst throughout the particulate silicon monoxide. For best results, it is preferred that the catalyst be distributed uniformly throughout the particulate silicon monoxide. A useful catalyst range is when the catalyst is 1 to 6 weight percent of the combined catalyst and silicon monoxide weight. Preferred is when the catalyst is at a level of 3 to 6 weight percent of the combined catalyst and silicon monoxide.

When a catalyst is employed in the process for reacting silicon monoxide with a hydrogen halide, the silicon monoxide may be activated or non-activated. The silicon monoxide, as well as the activation process, are as previously described for the process without catalyst. When activated silicon monoxide is employed in the process, the catalyst may be added to the silicon monoxide prior to activation or after activation. A preferred procedure is when the catalyst is added to the silicon monoxide prior to the activation procedure.

The silicon monoxide is contacted with a hydrogen halide in the presence of the catalyst. The materials are contacted in a reactor of a configuration as previously described for the uncatalyzed process. The halogen halide can be hydrogen chloride, hydrogen bromide, hydrogen fluoride, hydrogen iodide, or mixtures thereof.

The reaction temperature for the catalyzed process is in the range of 200° C. to 1200° C. A preferred reaction temperature range is about 300° C. to 900° C. A more preferred temperature range is about 300° C. to less than 500° C. By "about," is meant similar temperatures which give comparable results under similar process conditions.

Preferred conditions are where the hydrogen halide gas is passed through a bed of solid particulate silicon monoxide at a rate of 0.5 to 60 sccm per gram of silicon monoxide in the initial charge to the reactor. More preferred is when the hydrogen halide gas is passed through the silicon monoxide at a rate of 1 to 5 sccm per gram of silicon monoxide in the initial charge to the reactor.

The reaction time for hydrogen halide with silicon monoxide, in the presence of the catalyst, will depend upon such factors as: type of catalyst, activation conditions, reaction temperature, concentration and type of hydrogen halide, and desired conversion of silicon monoxide. In general, reaction times between 4 hours and 48 hours have been found to be useful. A preferred reaction time is about 24 hours. By "about," it is meant reaction times similar to 24 hours, which give comparable results. Shorter reaction times may be employed, but with reduced conversion of silicon monoxide. Longer reaction times may also be employed to advantage, depending upon the continuing presence of silicon monoxide in the reactor.

The silanes which can be produced by the catalyzed process are the same as those produced by the uncatalyzed processes. However, as demonstrated by the examples herein, the lower effective temperatures allowed by the catalyst can modify the distribution of the silane products.

In the described processes, solid silicon monoxide is made to react with the hydrogen halide as if it were an equimolar mixture of reactive silicon and inert silicon dioxide. Therefore, the reactive portion of silicon monoxide represents about 31.85 weight percent of the solid. The unreacted silicon, as silicon dioxide, can be recovered and, for example, recycled as feed to a process for making silicon metal or silicon monoxide. The unreacted silicon dioxide may also be used as a filler or filler and reinforcing agent. The unreacted silicon dioxide may be used as a filler, for example, in silicone emulsions or as a filler and reinforcing agent in silicone elastomers.

So that those skilled in the art may better understand the instant described processes, the following examples are offered as illustrative of the instant invention. The examples are not intended to be limiting on the processes as described herein.

EXAMPLE 1

The ability to react hydrogen chloride (HCl) with solid silicon monoxide in a fixed-bed reactor to form silanes was demonstrated. The fixed-bed reactor consisted of a vertical one-half inch diameter quartz tube, which contained a fixed bed of silicon monoxide supported on a quartz wool plug. The solid silicon monoxide was purchased from Alfa Products (Danvers, MA) and had a nominal purity of greater than 99.95 percent. The particle size of the silicon monoxide was less than 120 mesh.

The reactor was heated in a tube furnace. For runs 21 and 22, the temperature was increased stepwise through the range given in Table 1, over the period of the reaction. Feed gases entered at the top of the reactor and flowed downward. Product silanes were collected in a dry-ice cooled cold trap at the reactor's exit. The mixture collected in the cold trap was analyzed by gas chromatography. The result of these runs are presented in Table 1.

By the method of the instant invention, solid SiO can be made to react as if it were an equimolar mixture of reactive silicon and inert silicon dioxide. Therefore, the reactive portion of SiO represents 31.85 weight percent of the solid. For this reason, conversions of the solid silicon monoxide are expressed as the percentage of available silicon converted to chlorosilane products. The percent SiO conversion values were calculated as:

%Conv.=100×(Si in products (g) /0.3185×SiO added to reactor (g)).

Product distribution was calculated directly from the amounts of each silane product formed as a proportion of percent total product formed, as determined by chromatographic analysis:

Selectivity (wt %)=100×(specific product formed (g) /total silane product (g)).

The heading "Activation" refers to the activation conditions in hours (h) and degrees centigrade (° C.). The heading "Reaction" refers to the conditions under which the reaction process was conducted.

TABLE 1

| | Non-Activated and Non-Catalyzed Silicon Monoxide Reaction with HCl. | | | | | |
|---|---|---|---|---|---|---|
| | Activation | | Reaction | | % | Selectivity (Wt %) |
| Run | (h) | (°C.) | (h) | (°C.) | Conv. | $HSiCl_3$ | $SiCl_4$ |
| 21 | — | — | 22 | 300–1140 | 54.9 | 1.8 | 98.2 |
| 22 | — | — | 24 | 700–1140 | 64.4 | 2.0 | ~98 |
| 26 | — | — | 4 | 400 | 0.0 | 0.0 | 0.0 |
| 29 | — | — | 4 | 600 | 5.0 | 32.9 | 67.1 |
| 27 | — | — | 4 | 900 | 32.8 | 3.6 | 96.4 |

The data presented in Table 1 demonstrate the ability of HCl to react with solid silicon monoxide in an unactivated and uncatalyzed process at high temperatures.

EXAMPLE 2

The effect of the reaction temperature was evaluated. The reactor was similar to that described in Example 1. Powdered silicon monoxide from Alfa Products, as previously described, was activated by placing it in the reactor and heating it at a specified temperature under helium gas for a predetermined period of time. During the activation period a flow of the purging gas was maintained at a rate between about 20 to 30 standard cubic centimeters per minute (sccm). The typical flow rate for the hydrogen chloride was 5 to 30 sccm. The charge volume of the reactor varied between 1.6 and 2.7 grams. The average particle size of the silicon monoxide was two micron.

TABLE 2

| Effects of Reaction Temperature on Conversion and Selectivity of Activiated Silicon Monoxide. | | | | | | |
|---|---|---|---|---|---|---|
| | Activation | | Reaction | | | Selectivity (wt %) |
| Run | (h) | (°C.) | (h) | (°C.) | % Conv. | $HSiCl_3$ | $SiCl_4$ |
| 31 | 12 | 200 | 4 | 600 | 13.5 | 39.6 | 60.4 |
| 24 | 14 | 200 | 22 | 900 | 68.4 | 3.5 | 96.5 |

Analysis of the data of Table 2 indicates that silicon conversion and $SiCl_4$ selectivity increase with increasing temperature.

EXAMPLE 3

A series a runs were made to investigate the ability of a catalyst such as CuCl to promote low temperature reactivity. The effect of the activation temperature was also evaluated. The apparatus employed was similar to that previously described in Example 2.

A catalyzed reactor charge was prepared by shaking powdered silicon monoxide with powdered CuCl for 30 to 60 minutes. The silicon monoxide, purchased from Cerac, Inc. (Milwaukee, WI), had a particle size smaller than a 325 mesh and a nominal purity of 99.99%. The CuCl (Cuprous Chloride, Type II) was purchased from Calabrian Chemical (Houston, TX). The CuCl was added to the silicon monoxide at a level of 2.94 to 3.23 weight percent of the combined weight of CuCl and silicon monoxide.

After placing the catalyzed charge in the reactor, the reactor was purged with helium for at least 30 minutes, and then activated under flowing helium (8 sccm) at temperatures and for times given in Table 3. The reaction was run by passing hydrogen chloride gas through the activated charge at a rate of 5 to 10 sccm, under conditions of time and temperature presented in Table 3. Headings for Table 3 are as previously described.

TABLE 3

Cuprous Chloride Catalyzed Reaction of Activated Silicon Monoxide With Hydrogen Chloride

| Run | Activation (h) | Activation (°C.) | Reaction (h) | Reaction (°C.) | % Conv. | Selectivity (wt %) HSiCl$_3$ | Selectivity (wt %) SiCl$_4$ |
|---|---|---|---|---|---|---|---|
| 76A | 12 | 125 | 24 | 300 | 6.6 | 83.9 | 16.1 |
| 81A | 16 | 200 | 24 | 300 | 9.5 | 83.0 | 17.0 |
| 82A | 16 | 400 | 24 | 300 | 38.3 | 81.1 | 18.9 |
| 78A | 15 | 800 | 24 | 300 | 50.3 | 84.8 | 15.2 |

The data presented in Table 3 demonstrates that CuCl significantly promotes the reactivity of silicon monoxide with hydrogen chloride at 300° C. This reaction is further enhanced by high-temperature activation of the reactor charge prior to reaction with hydrogen chloride. Silicon conversion increased with increased activation temperature. Under the described conditions, there was selectivity for HSiCl$_3$ and this selectivity was independent of activation temperature.

EXAMPLE 4

The effects of catalyst level and activation times on silicon conversion and selectivity of the process for HSiCl$_3$ were evaluated. Experimental procedures and feed materials were as described in Example 3. The results of this series of experiments are presented in Table 4. The headings of Table 4 are as previously described. The additional heading "CuCl (wt %)" refers to the weight percentage of CuCl in the combined CuCl and silicon monoxide mixture.

TABLE 4

Silicon Monoxide Reaction With Hydrogen Halide: Effect of Catalyst Concentration and Activation time

| Run | Activation (h) | Activation (°C.) | Reaction (h) | Reaction (°C.) | CuCl (wt %) | % Conv. | Selectivity (wt %) HSiCl$_3$ | Selectivity (wt %) SiCl$_4$ |
|---|---|---|---|---|---|---|---|---|
| 1A | 1 | 800 | 24 | 300 | 2.96 | 32.6 | 87.3 | 12.7 |
| 87A | 1 | 800 | 24 | 300 | 6.00 | 31.1 | 88.3 | 11.7 |
| 78A | 15 | 800 | 24 | 300 | 2.94 | 50.3 | 84.8 | 15.2 |
| 94A | 16 | 800 | 48 | 300 | 6.03 | 50.3 | 89.5 | 10.5 |
| 90A | 16 | 300 | 24 | 600 | 3.00 | 59.0 | 50.6 | 49.4 |

The results presented in Table 4 demonstrate that increasing the level of the catalyst, CuCl, above 3 weight percent has little effect on conversion or selectivity of the process. The data also demonstrates that longer activation times result in substantially higher silicon conversions, with little impact on HSiCl$_3$ selectivity. Increased reaction temperature increased SiCl$_4$ formation.

What is claimed is:

1. A process for preparing silances of the formula $H_n SiX_{4-n}$, where n=1 to 4 and X is a halogen, the process comprising contacting solid silicon monoxide with a hydrogen halide of formula

HX, where X is a halogen; at a reaction temperature of 500° C. to 1200° C.

2. A process according to claim 1, were the hydrogen halide is hydrogen chloride.

3. A process for preparing silanes of the formula $H_n SiX_{4-n}$, where n=0 to 4 and X is a halogen; the process comprising: reacting solid silicon monoxide with a hydrogen halide of formula

HX, where X is a halogen; in the presence of a catalyst effective in facilitating reaction of the solid silicon monoxide with the hydrogen halide; at a reaction temperature of about 200° C. to 1200° C.

4. A process according to claim 3, where the catalyst is selected from the group consisting of copper and copper compounds, tin and tin compounds, zinc and zinc compounds, antimony and antimony compounds, manganese and manganese compounds, mercury and mercury compounds, iron and inorganic iron compounds, nickel and nickel compounds, phosphorous, metal phosphides, metal phosphorous alloys, aluminum salts, and mixtures thereof.

5. A process according to claim 4, where the catalyst is selected from the group consisting of copper and copper compounds.

6. A process according to claim 5, where the catalyst is CuCl.

7. A process according to claim 4, where the catalyst is selected from the group consisting of tin and tin compounds.

8. A process according to claim 4, where the catalyst is selected from the group consisting of CuCl, ZnCl$_2$, SnCl$_2$, copper and phosphorous alloy, and mixtures thereof.

9. A process according to claim 4, where the catalyst is present at a level of 1 to 6 weight percent of the combined catalyst and silicon monoxide weight.

10. A process according to claim 3, where the reaction temperature is 300° C. to 900° C. and the hydrogen halide is hydrogen chloride.

11. A process according to claim 10, where the catalyst is CuCl and the catalyst is present at a level of 3 to 6 weight percent of the combined catalyst and silicon monoxide weight.

12. A process according to claim 3, where the solid silicon monoxide is activated by heating at an activation temperature of 200° C. to 900° C., in an inert atmosphere, for an activation time of 1 to 20 hours, prior to contact with the hydrogen halide.

13. A process according to claim 12, where the solid silicon monoxide is activated by heating prior to mixing with the catalyst.

14. A process according to claim 12, where the solid silicon monoxide is activated by heating after mixing with the catalyst.

15. A process according to claim 12, where the catalyst is selected from the group consisting of copper and copper compounds, tin and tin compounds, zinc and zinc compounds, antimony and antimony compounds, manganese and manganese compounds, mercury and mercury compounds, iron and inorganic iron compounds, nickel and nickel compounds, phosphorous, metal phosphides, metal phosphorous alloys, aluminum salts, and mixtures thereof.

16. A process according to claim 15, where the catalyst is selected from the group consisting of copper and copper compounds.

17. A process according to claim 16, where the catalyst is CuCl.

18. A process according to claim 15, where the catalyst is selected from the group consisting of tin and tin compounds.

19. A process according to claim 15, where the catalyst is selected from the group consisting of CuCl, $ZnCl_2$, $SnCl_2$, copper and phosphorous alloy, and mixtures thereof.

20. A process according to claim 14, where the catalyst is present at a level of 1 to 6 weight percent of the combined catalyst and silicon monoxide weight.

21. A process according to claim 20, where the reaction temperature is about 300° C. to less than 500° C.; the activation temperature is 400° C. to 800° C,; the activation time is 10 to 18 hours; and the hydrogen halide is hydrogen chloride.

* * * * *